US012722566B2

(12) United States Patent
Takeshige et al.

(10) Patent No.: US 12,722,566 B2
(45) Date of Patent: Sep. 1, 2026

(54) VEHICULAR LIGHTING STRUCTURE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Mitsuhiko Takeshige, Nagakute (JP); Isao Shinagawa, Toyota (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/328,368

(22) Filed: Sep. 15, 2025

(65) Prior Publication Data

US 2026/0103145 A1 Apr. 16, 2026

(30) Foreign Application Priority Data

Oct. 15, 2024 (JP) ................................ 2024-179975

(51) Int. Cl.
*B60Q 3/30* (2017.01)
*B60Q 3/51* (2017.01)
*B60Q 3/60* (2017.01)

(52) U.S. Cl.
CPC ................ *B60Q 3/30* (2017.02); *B60Q 3/51* (2017.02); *B60Q 3/60* (2017.02)

(58) Field of Classification Search
CPC ......... B60Q 3/30; B60Q 3/35; F21W 2106/00
See application file for complete search history.

(56) References Cited

U.S. PATENT DOCUMENTS

2013/0155659 A1* 6/2013 Ahn ........................ F21V 21/04 362/157
2017/0313244 A1* 11/2017 Luciew ............... B60Q 1/2696

FOREIGN PATENT DOCUMENTS

JP 4704405 6/2011

* cited by examiner

*Primary Examiner* — Sean P Gramling
(74) *Attorney, Agent, or Firm* — Greenblum & Bernstein, P.L.C.

(57) ABSTRACT

A vehicular lighting structure includes a finisher that has a plate shape extending in an upper-bottom direction and a vehicular width direction and is disposed at a rear end of a luggage compartment and includes a lighting hole, a lighting device disposed on a vehicular exterior side of the finisher and supplying light to an inner space of the luggage compartment through the lighting hole, and a projecting portion projecting obliquely downward from an upper hole edge of the lighting hole toward the inner space of the luggage compartment.

18 Claims, 7 Drawing Sheets

VEHICULAR LIGHTING STRUCTURE

CROSS REFERENCE TO RELATED APPLICATION

This application claims priority from Japanese Patent Application No. 2024-179975 filed on Oct. 15, 2024. The entire contents of the priority application are incorporated herein by reference.

TECHNICAL FIELD

The present technology described herein relates to a vehicular lighting structure in a luggage compartment.

BACKGROUND

There has been known a lighting structure mounted in a vehicular luggage compartment. In one example of such a lighting structure, a light bulb is arranged in a space formed in a side surface of the trunk room of an automobile and light from the light bulb is supplied to the inner space of the trunk room through a hole (a lens) that faces downward.

SUMMARY

Only one lighting device may be mounted in a rear section of the luggage compartment to keep a mounting space and a wiring space or to reduce a producing cost. As one example, a lighting device may be mounted in a luggage compartment finisher that is configured as a rear wall of the luggage compartment.

A battery may be arranged in a front section of the luggage compartment and in such a configuration, not only the floor of the luggage compartment but also the section in front of the luggage compartment needs to be lighted. Therefore, it is desirable to mount the lighting device in a higher place to light a wide area. However, with the lighting device being mounted in a higher place, light emitted by the lighting device is likely to be directed to eyes of a passenger or a person who is standing beside the vehicle and the passenger or the person is dazzled. Since the light rays radially spread, light rays from the lighting device that is mounted on the side surface of the trunk are less likely to reach a portion right below the lighting device as higher the position of the lighting device is. As a result, the rear portion of the floor of the luggage compartment becomes darker.

An object of the present technology described herein is to provide a vehicular lighting structure with which light from a lighting device is less likely to be directed toward eyes of a passenger or a person standing beside a vehicle and the light is supplied to a rear end portion of a luggage compartment.

The technology described herein is related to a vehicular lighting structure that includes a finisher that has a plate shape extending in an upper-bottom direction and a vehicular width direction and is disposed at a rear end of a luggage compartment and includes a lighting hole, a lighting device disposed on a vehicular exterior side of the finisher and supplying light to an inner space of the luggage compartment through the lighting hole, and a projecting portion projecting obliquely downward from an upper hole edge of the lighting hole toward the inner space of the luggage compartment.

DETAILED DESCRIPTION

One embodiment will be described with reference to FIGS. 1 to 5. A lighting structure 1 according to this embodiment is in a luggage compartment 12 that is in a rear section of a vehicle 10. Arrows of FR and RR represent a front side and a rear side of the vehicle 10, arrows of UP and DW represent an upper side and a lower side, and arrows of R and L represent a right side and a left side in a forwarding direction of the vehicle 10.

Figure 1:
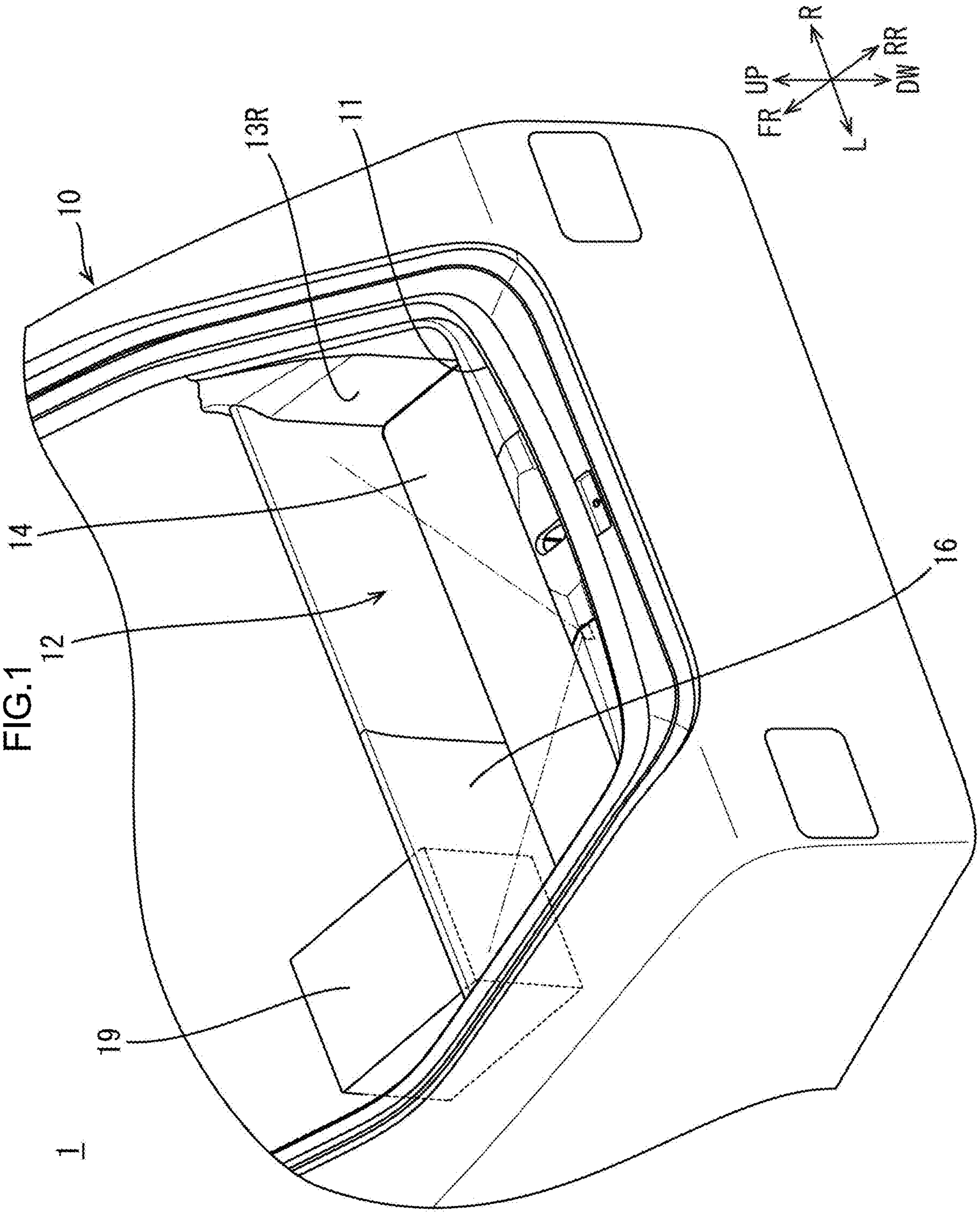
FIG. 1 is a rear perspective view of a luggage compartment of a vehicle that includes a lighting structure according to one embodiment.

FIG. 1 is a perspective view of a rear section of the vehicle 10 that includes the lighting structure 1 seen from the upper left side. As illustrated in FIG. 1, the vehicle 10 of a hatchback type includes the luggage compartment 12 in the rear section and a rear door 17 is opened such that the luggage compartment 12 is accessible through a rear opening 11. The luggage compartment 12 includes deck side trims 13R, 13L, a finisher 20, a deck board 14, a floor board 15, and a cover wall 16.

Figure 2:
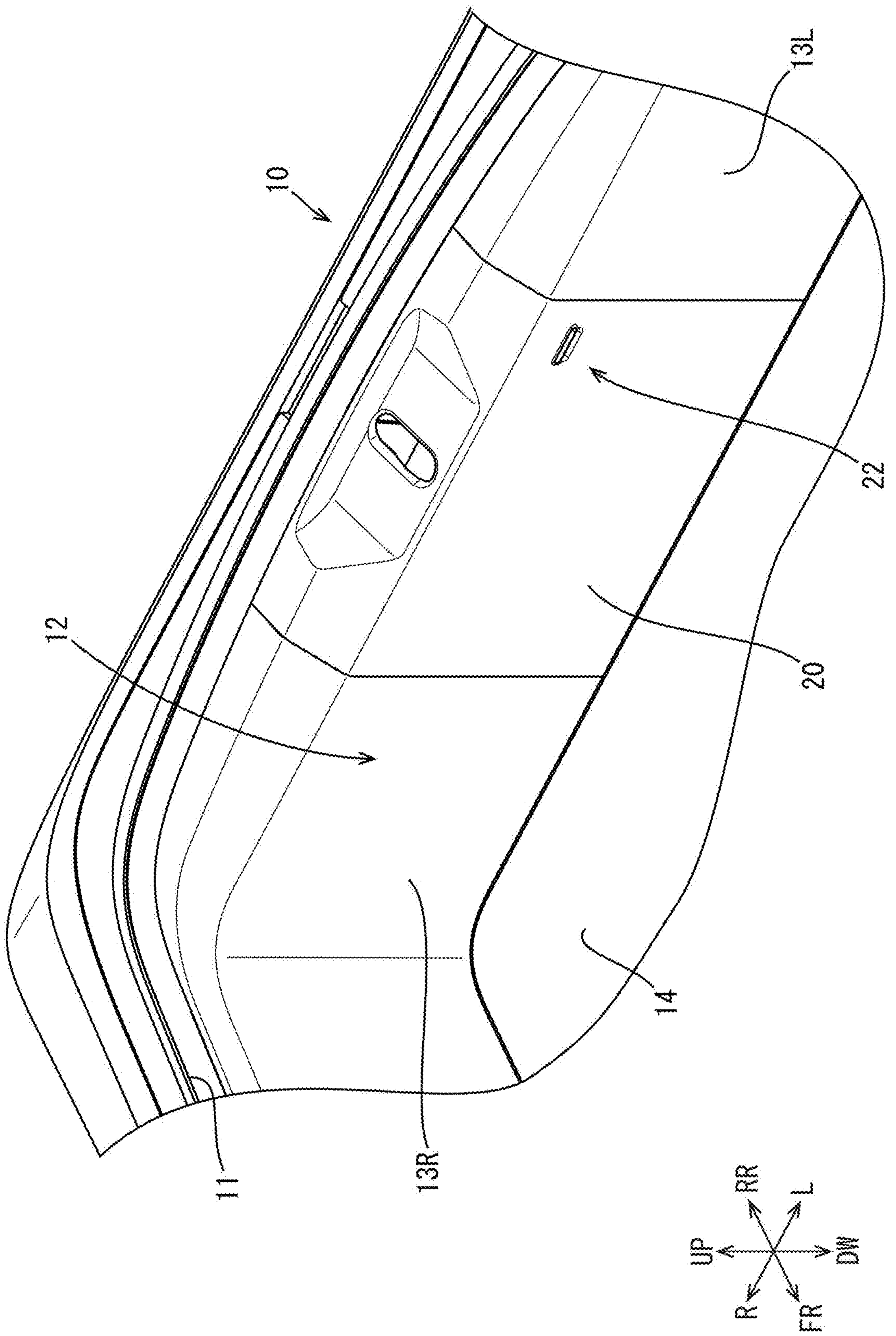
FIG. 2 is an enlarged perspective view of a rear wall portion of the luggage compartment.
Figure 4:
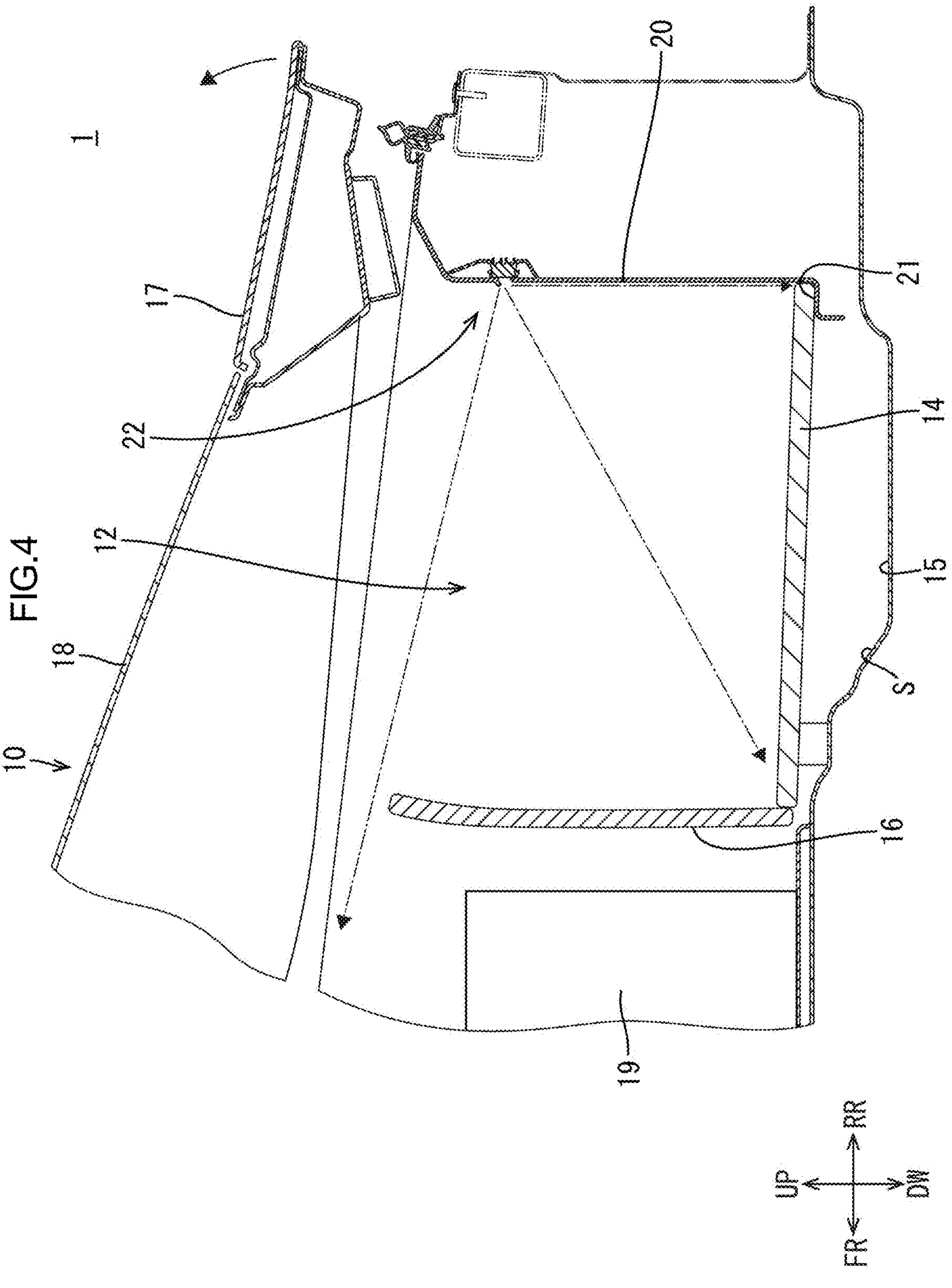
FIG. 4 is a cross-sectional view of the luggage compartment.

As illustrated in FIG. 2, the deck side trims 13R, 13L are configured as right and left side walls of the luggage compartment 12. Rear end portions of the deck side trims 13R, 13L are curved toward a vehicular interior side with respect to a vehicular width direction and are configured as portions of a rear wall portion of the luggage compartment 12. The finisher 20 is a plate member disposed at a rear end of the luggage compartment 12. The finisher 20 is disposed between the rear end portions the deck side trims 13R, 13L so as to vertically extend. The finisher 20 is a rectangular plate member having a wall surface that vertically extends. The wall surface of the finisher 20 that faces frontward is configured as a portion of a rear wall surface of the rear wall portion of the luggage compartment 12. The cover wall 16 is disposed between front end portions of the deck side trims 13R, 13L and vertically extends. A battery 19 (one example of a functional component) is arranged in front of the cover wall 16. As illustrated in FIG. 4, the battery 19 is disposed below a rear window of the rear door 17 with the rear door 17 being closed.

The deck side trims 13R, 13L and the finisher 20 includes flange portions 21 in lower portions thereof and the flange portions 21 extend toward the interior side of the luggage compartment 12. As illustrated in FIG. 4, the deck board 14 is placed on the flange portions 21 to cover an arrangement space S below the floor. The deck board 14 placed on the flange portions 21 is configured as the floor of the luggage compartment 12.

A lighting section 22 for lighting the inner space of the luggage compartment 12 is in the finisher 20. As illustrated in FIG. 2, the lighting section 22 is in an upper left portion of the finisher 20. Specifically, the lighting section 22 is in a portion of the finisher 20 upper than a middle of the finisher 20 with respect to the upper-bottom direction and on a left side of a middle of the finisher 20 with respect to a vehicular width direction.

Figure 5:
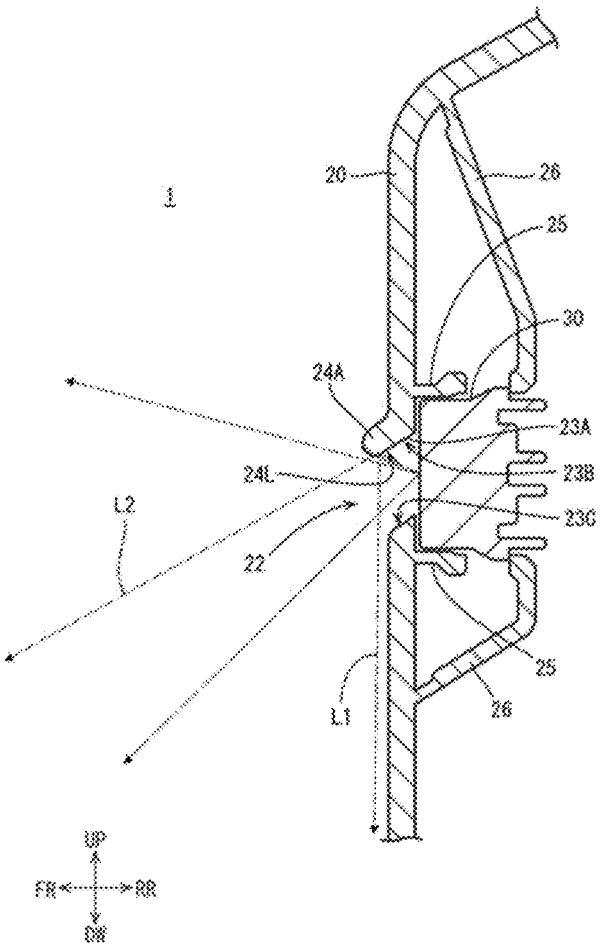
FIG. 5 is a cross-sectional view of the lighting section.

The lighting section 22 includes a lighting device 30 that is arranged on a vehicular exterior side surface (a rear side surface) of the finisher 20 and a lighting hole 23 in the finisher 20. As illustrated in FIG. 5, light emitted by the lighting device 30 travels toward the inner space of the luggage compartment 12 through the lighting hole 23.

The lighting device 30 includes a casing and LEDs arranged in the casing. At least a portion of the casing that faces the lighting hole 23 is made of light transmissive material. The LEDs are connected to a power supply installed in the vehicle 10. A pair of positioning ribs 25 project from the vehicular exterior side surface of the finisher 20 and have a width extending in the vehicular width direction. One of the two positioning ribs 25 is on an upper side of the lighting hole 23 and the other one of the two positioning ribs 25 is on a lower side of the lighting hole 23. The lighting device 30 is held by the pair of positioning ribs 25 and positioned in a proper height position corresponding to the lighting hole 23. With the lighting device 30 being held by the positioning ribs 25, the lighting device 30 faces the lighting hole 23. A pair of holding pieces 26 project from the vehicular exterior side surface of the finisher 20 and have a width extending in the vehicular width direction. One of the two holding pieces 26 projects from a portion of the vehicular exterior side surface that is upper than the portion where the upper positioning rib 25 projects and the other one of the two holding pieces 26 projects from a portion of the vehicular exterior side surface that is lower than the portion where the lower positioning rib 25 projects. The lighting device 30 is held by the pair of holding pieces 26 such that ends of the holding pieces 26 are contacted with a rear surface of the lighting device 30. Thus, the lighting device 30 is mounted on the finisher 20 such that a front surface of the lighting device 30 is closer to or contacted with the vehicular exterior side surface of the finisher 20.

Figure 3:
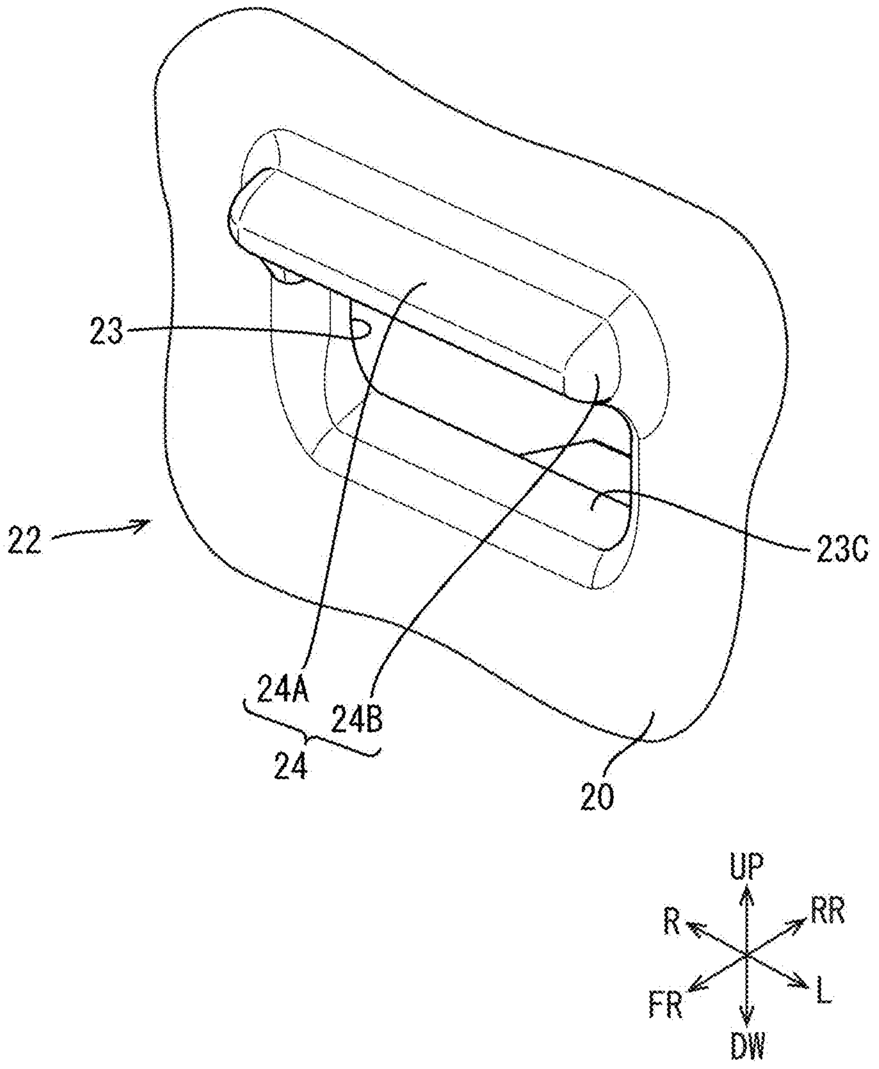
FIG. 3 is a perspective view of a lighting hole in a finisher and a projecting portion.

As illustrated in FIGS. 3 and 5, the lighting hole 23 is in a portion of the finisher 20 corresponding to the lighting device 30 and is a rectangular hole that is through the finisher 20 in the plate thickness direction. The lighting hole 23 has a rectangular shape elongated in the vehicular width direction. The lighting hole 23 is slightly smaller than a front surface of the lighting device 30. As illustrated in FIG. 5, the lighting device 30 is mounted on the finisher 20 to be closer or contacted with a peripheral portion of the lighting hole 23.

A projecting portion 24 projects from an upper hole edge 23A of the lighting hole 23 toward the inner space of the luggage compartment 12. The projecting portion 24 extends in the vehicular width direction along the upper hole edge 23A. The projecting portion 24 has a width substantially same as an entire width of the upper hole edge 23A. The projecting portion 24 projects obliquely downward from the upper hole edge 23A. A lower surface 24L of the upper wall portion 24A extends obliquely downward. As illustrated in FIG. 3, the projecting portion 24 is a plate member as a whole. The projecting portion 24 includes an upper wall portion 24A and side wall portions 24B. The upper wall portion 24A is a flat plate member projecting from the upper hole edge 23A of the lighting hole 23. The side wall portions 24B project from the interior side surface (a front surface) of the finisher 20 and extend to close a space between each of right and left side ends of the upper wall portion 24A and the interior side surface of the finisher 20.

In this embodiment, the projecting portion 24 (the upper wall portion 24A) is inclined at an inclination angle of about 60 degrees with respect to the interior side surface (a wall surface) of the finisher 20. The inclination angle of the projecting portion 24 (the upper wall portion 24A) may be changed as appropriate depending on the position of the lighting hole 23 from the floor of the luggage compartment 12 (the deck board 14) and the distance between the cover wall 16 and the finisher 20. The inclination angle of the projecting portion 24 can be determined as appropriate according to the height position of the lighting hole 23 and the distance between the cover wall 16 and the finisher 20 such that the front end portion of the luggage compartment 12 can be lighted brightly when the battery 19 is installed and removed.

As illustrated in FIG. 5, the lighting hole 23 has an inner peripheral surface. The inner peripheral surface of the lighting hole 23 includes an upper peripheral surface 23B on an upper side and a lower peripheral surface 23C on a lower side. The upper peripheral surface 23B and the lower peripheral surface 23C extend parallel to each other and extend along the projecting portion 24. The upper peripheral surface 23B and the lower peripheral surface 23C are sloped parallel to the projecting portion 24. The lower surface 24L of the projection portion 24 is continuous to the upper peripheral surface 23B of the lighting hole 23. The lower surface 24L is a smooth surface and reflects light.

The lower surface 24L of the projecting portion 24 is subjected to mirror finishing. Light emitted by the lighting device 30 travels through the lighting hole 23 toward the inner space of the luggage compartment 12. As illustrated in FIG. 5, some of the light rays (L1, L2) from the lighting device 30 that travel upward reflect off the projecting portion 24 (the lower surface 24L) toward the front lower side. Therefore, the light from the lighting device 30 does not spread upward widely.

In the vehicle 10 including the lighting structure 1 of this embodiment, with the rear door 17 being opened, the lighting device 30 is turned on and the luggage compartment 12 is lighted by the lighting device 30. As illustrated in FIGS. 4 and 5, some of the light rays emitted by the lighting device 30 travel upward through the lighting hole 23 and are reflected by the projecting portion 24 and travel downward (light L1, L2). Particularly, some of the light rays emitted by the lighting device 30 and reflected by the projection portion 24 travel in a vertical direction (light L1). Thus, the light from the lighting device 30 does not spread widely upward. Therefore, the light from the lighting device 30 is less likely to directly enter the eyes of a person standing in front of or beside the vehicle 10 and the dazzle of light is suppressed. The light rays reflecting off the projecting portion 24 surely reach the rear section of the luggage compartment 12 compared to a configuration without including the projecting portion 24. The whole luggage compartment 12 is lighted brightly.

Figure 6:
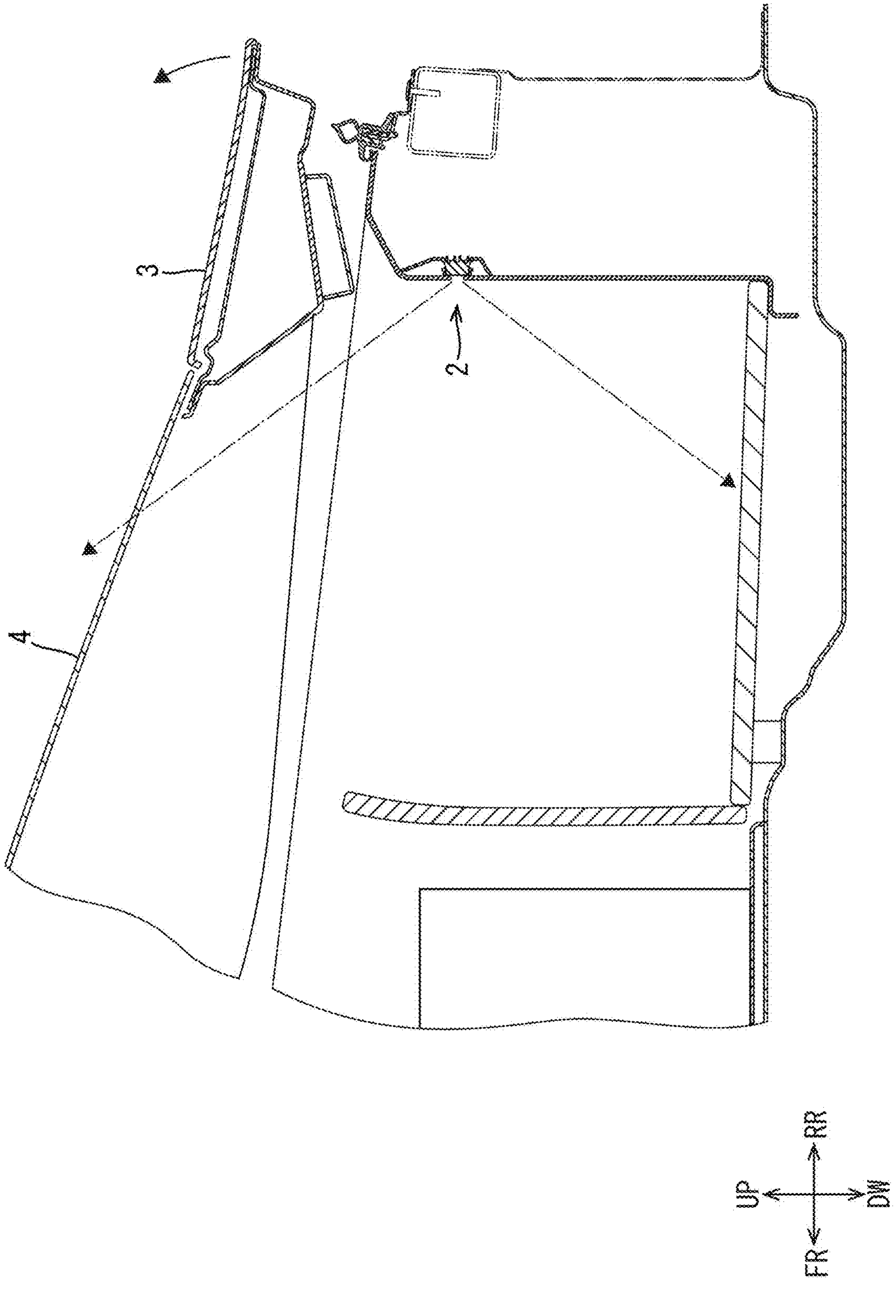
FIG. 6 is a cross-sectional view of a luggage compartment including a lighting section without including the projecting portion.
Figure 7:
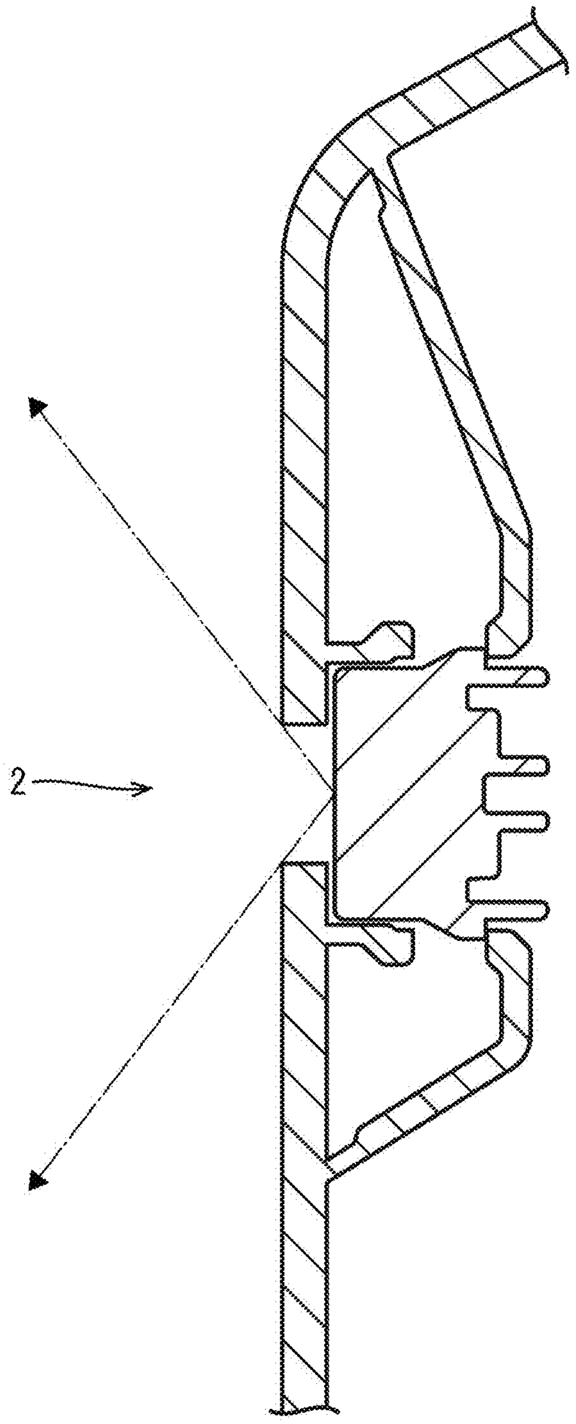
FIG. 7 is a cross-sectional view of the lighting section without including the projecting portion.

In a configuration of a lighting section 2 that does not include the projection portion 24 as illustrated in FIGS. 6 and 7, light from the lighting section 2 exits to the outside the vehicle with a rear door 3 being completely opened and light from the lighting section 2 exits through a rear window 4 to the outside the vehicle with the rear door 3 being closed. Therefore, the light is likely to be directed to the eyes of a person standing beside the vehicle and easily dazzles the person. The light from the lighting section 2 only spreads radially. Therefore, the space below the lighting section 2 and the space near the rear end of the luggage compartment is less likely to be lighted and dark.

Next, operations and effects will be described. The lighting structure 1 according to this embodiment includes the finisher 20 that is disposed in a rear end of the luggage compartment 12 of the vehicle 10 and has a wall surface extending in the upper-bottom direction and the vehicular width direction and the lighting device 30 that is disposed on the vehicular exterior side of the finisher 20. The finisher 20 includes the lighting hole 23 through which light from the lighting device 30 travels toward the inner space of the luggage compartment 12. The projecting portion 24 projects obliquely downward from the upper hole edge 23A of the lighting hole 23 toward the inner space of the luggage compartment 12.

According to the above configuration, the light emitted by the lighting device 30 radially spreads and travels toward the inner space of the luggage compartment 12 through the lighting hole 23 and some of the light rays from the lighting device 30 travel upward and are reflected by the projecting portion 24 toward the front lower side. Therefore, light is less likely to be directed toward the eyes of passenger or a person standing beside the vehicle 10 and the dazzle of light is suppressed. The light rays travelling upward are reflected by the projecting portion 24 downward. Therefore, compared to the configuration without including the projecting portion 24, the rear end portion of the floor (the deck board 14) of the luggage compartment 12 that is near the finisher 20 can be lighted brightly.

The upper peripheral surface 23B and the lower peripheral surface 23C of the inner peripheral surface of the lighting hole 23 extend parallel to the projecting portion 24 and are inclined obliquely downward as they extend frontward. In a configuration in which the lower peripheral surface of the lighting hole is not inclined with respect to the thickness direction of the finisher and extends along the thickness direction (in a horizontal direction) or extends vertically to the plate surface of the finisher, among the light rays from the lighting device 30 radially spread downward, a larger amount of light rays are reflected by the horizontally extending lower peripheral surface of the lighting hole and travel upward higher. Therefore, in such a configuration, the rear lower portion of the luggage compartment is supplied with less light rays and dark. On the other hand, in this embodiment having the above configuration, the lower peripheral surface 23C of the inner peripheral surface of the lighting hole 23 extends parallel to the projecting portion 24 and is inclined obliquely downward as it extends frontward. Therefore. Some of the light rays from the lighting device 30 that radially spread downward and travel through the lighting hole 23 travel downward. Therefore, a larger area of the rear end portion of the luggage compartment 12 that is near the finisher 20 can be lighted more brightly compared to the configuration including the lower peripheral surface that is not inclined obliquely downward.

The lighting section 22 is in a portion of the finisher 20 upper than a middle of the finisher 20 with respect to the height direction. The lighting hole 23 is in a portion of the finisher 20 upper than a middle of the finisher 20 with respect to the upper-bottom direction. With such a configuration, a portion or a space in front of the luggage compartment 12 can be lighted.

The lower surface 24L of the projecting portion 24 is a smooth surface that reflects light. According to such a configuration, a greater amount of light rays from the lighting device 30 can be reflected by the projecting portion 24. Therefore, the inner space of the luggage compartment 12 can be lighted more brightly with the reflected light rays.

Furthermore, the battery 19 disposed in front of the luggage compartment 12 can be lighted with the light from the lighting device 30.

OTHER EMBODIMENTS

The technology described herein is not limited to the embodiments described above with reference to the drawings. The following embodiments may be included in the technical scope. The technology described herein may be modified within the technical scope.

(1) In the above embodiment, the lower peripheral surface 23C of the inner peripheral surface of the lighting hole 23 extends parallel to the projecting portion 24. However, the lower peripheral surface 23C may not extend parallel to the projecting portion 24.

(2) The position of the lighting section 22 (the lighting hole 23) is not limited to that of the above embodiment.

(3) The lower surface 24L of the projecting portion 24 may not be a smooth surface as long as the lower surface 24L reflects light from the lighting device 30.

(4) No functional component may be disposed in front of the luggage compartment 12 or the light from the lighting section 22 may not be supplied to the functional component.

The invention claimed is:

1. A vehicular lighting structure comprising:

a finisher that has a plate shape extending in an upper-bottom direction and a vehicular width direction and is disposed on a vehicular rear side of a luggage compartment and includes a lighting hole;

a lighting device disposed on the vehicular rear side of the finisher such that a light emitting surface of the lighting device faces the lighting hole and supplying light to an inner space of the luggage compartment positioned on a vehicular front side of the finisher through the lighting hole; and a projecting portion projecting obliquely downward from an upper hole edge of the lighting hole toward the inner space of the luggage compartment.

2. The vehicular lighting structure according to claim 1, wherein the lighting hole has an inner peripheral surface extending between a vehicular front side surface and a vehicular rear side surface of the finisher and at least a lower surface of the inner peripheral surface is inclined to be parallel to the projecting portion.

3. The vehicular lighting structure according to claim 1, wherein the lighting hole is in an upper portion of the finisher that is upper than a middle of the finisher in the upper-bottom direction, and the lighting device is disposed to face the lighting hole.

4. The vehicular lighting structure according to claim 1, wherein the projecting portion has a lower surface that is smooth and reflects light from the lighting device.

5. The vehicular lighting structure according to claim 1, wherein light from the lighting device reaches a functional component that is disposed on the vehicular front side of the luggage compartment.

6. The vehicular lighting structure according to claim 1, wherein the projecting portion is a plate member and reflects light from the lighting device toward the inner space of the luggage compartment.

7. The vehicular lighting structure according to claim 1, wherein the lighting hole has an elongated shape extending in the vehicular width direction, and the projecting portion extends in the width direction along the upper hole edge of the lighting hole.

8. The vehicular lighting structure according to claim 1, wherein the lighting hole has an inner peripheral surface extending between a vehicular front side surface and a vehicular rear side surface of the finisher and an upper surface of the inner peripheral surface is inclined to be parallel to the projecting portion, the projecting portion is a plate member and reflects light from the lighting device toward the inner space of the luggage compartment, and the projecting portion has a lower surface that is continuous to the upper surface of the inner peripheral surface.

9. The vehicular lighting structure according to claim 1, wherein a lower end of the projecting portion is higher than a center of the lighting device.

10. The vehicular lighting structure according to claim 1, wherein the projection portion projects from a vehicular front side surface of the finisher.

11. The vehicular lighting structure according to claim 1, wherein no projection portion is provided on a lower hole edge of the lighting hole.

12. The vehicular lighting structure according to claim 1, wherein the lighting hole has an inner peripheral surface that extends from a vehicular front side surface to a vehicular rear side surface of the finisher, and an upper surface and a lower surface of the inner peripheral surface are inclined to be parallel to the projection portion.

13. The vehicular lighting structure according to claim 9, wherein the projection portion projects from a vehicular front side surface of the finisher.

14. The vehicular lighting structure according to claim 9, wherein no projection portion is provided on a lower hole edge of the lighting hole.

15. The vehicular lighting structure according to claim 9, wherein the lighting hole has an inner peripheral surface that extends from a vehicular front side surface to a vehicular rear side surface of the finisher, and an upper surface and a lower surface of the inner peripheral surface are inclined to be parallel to the projection portion.

16. The vehicular lighting structure according to claim 10, wherein no projection portion is provided on a lower hole edge of the lighting hole.

17. The vehicular lighting structure according to claim 10, wherein the lighting hole has an inner peripheral surface that extends from the vehicular front side surface to a vehicular rear side surface of the finisher, and an upper surface and a lower surface of the inner peripheral surface are inclined to be parallel to the projection portion.

18. The vehicular lighting structure according to claim 11, wherein the lighting hole has an inner peripheral surface that extends from a vehicular front side surface to a vehicular rear side surface of the finisher, and an upper surface and a lower surface of the inner peripheral surface are inclined to be parallel to the projection portion.

* * * * *